May 20, 1947.  T. HARRISON ET AL  2,420,705
BOOKBINDING MACHINE
Filed March 6, 1944  7 Sheets-Sheet 1

INVENTORS
THOMAS HARRISON
JOHN LUKE BROOKS
By Cushman, Darby & Cushman
ATTORNEYS May 20, 1947. T. HARRISON ET AL 2,420,705
BOOKBINDING MACHINE
Filed March 6, 1944 7 Sheets-Sheet 3

INVENTORS
THOMAS HARRISON
JOHN LUKE BROOKS
BY Cushman, Darby & Cushman
ATTORNEYS May 20, 1947.  T. HARRISON ET AL  2,420,705
BOOKBINDING MACHINE
Filed March 6, 1944  7 Sheets-Sheet 4

INVENTORS
THOMAS HARRISON
JOHN LUKE BROOKS
By Cushman, Darby & Cushman
ATTORNEYS May 20, 1947.  T. HARRISON ET AL  2,420,705
BOOKBINDING MACHINE
Filed March 6, 1944  7 Sheets-Sheet 6

INVENTORS
THOMAS HARRISON
JOHN LUKE BROOKS
By Cushman, Darby & Cushman
ATTORNEYS

Patented May 20, 1947

2,420,705

UNITED STATES PATENT OFFICE 2,420,705

BOOKBINDING MACHINE

Thomas Harrison, Colindale, London, and John Luke Brooks, Walford, Wimborne, England Application March 6, 1944, Serial No. 525,216
In Great Britain March 2, 1943

11 Claims. (Cl. 11—1)

This invention relates to improvements in book-binding machines of the type in which T-shaped slots are made in the back of the clamped book and tapes are passed through the heads of the T's, the tapes being thereafter glued to the inside covers. The stem of the T-slot is made for example by a saw cut and the head of the T is pierced by a T-section blade.

An object of this invention is to provide an improved arrangement for inserting the tapes through the heads of the T slots whereby the operation of slotting and taping a book is expedited and the risk of a tape being accidentally removed from a slot before it is glued is reduced.

Another object is to enable the cutting means which form the cross piece of the T slot to participate in the threading of the tape in the slot immediately following the cutting operation, and to disengage the slot cutting means from the tape as soon as the threading is completed.

Another object is to retain the book securely clamped in such a manner that the sheets are not liable to be torn during the slot cutting and taping operation, and nevertheless to enable the book to be rapidly and easily moved from a cutting and tape threading position to a postion convenient for the glueing of the tape ends without risk of deformation of the book.

Another object is to provide book clamping means which in one condition support the sheets adjacent to the back of the book against the pressure of the slot cutting means and which can thereafter be caused to render accessible the parts of the inside covers of the book adjacent to the back of the book for the glueing operation while still maintaining the book securely clamped.

Other objects and advantages of the invention will be apparent from the following description of a preferred embodiment thereof, given with reference to the accompanying drawings, in which:

Fig. 16 is a section of a detail taken on the lines 16—16 in Figs. 2 and 17.

Fig. 17 is a section taken on the line 17—17 in Fig. 16, and

Referring to Figs. 1 to 5, the frame castings 20A and 20B are provided with bottom rails 21A and 21B adapted to rest on a suitable sub-frame or bed (not shown) and with top rails providing inwardly-opening channels 22A and 22B forming guides for the side members of the carriage.

The book-clamping means comprises an upper clamp and a lower clamp, which are independently operable. Both clamps are tightened on the book before the cutting and piercing operations start. The lower clamp serves to prevent the pages from being pushed out of position in the neighbourhood of the T-slots by the saws and knives and after the cutting and piercing operations the lower clamp is released. The upper clamp holds the book after it has been cut and pierced and the tapes have been inserted and it is mounted to be rotated to enable the book to be raised clear of the lower clamp and be inverted, so as to render the tapes accessible for the purpose of sticking down their ends.

The front element of the lower clamp, which serves as an abutment member, includes any desired number of dies 23 (Figs. 1, 2, 10, 16 and 17) which are carried by a transverse bar 24 rigidly secured to the frame castings, these dies being adjustable to various positions transversely of the frame. Each die 23 has a pair of rearwardly extending wings 123 spaced apart by the width of the head of the T-slots. These wings terminate in clamping lugs 124 projecting towards each other and spaced apart by the width of the stem of the T-slots. The lugs 124 form abutments against which the slotting and piercing operations are carried out. The upper portions of the rear faces of the wings 123 are inclined forwards to accommodate a part depending from the upper clamp, as described below.

The rear element of the lower clamp is a transverse plate 25 carried by two screw-threaded pins 26 which are longitudinally slidable in guides in a transverse bar 27 rigidly fixed to the frame castings. The guides for these pins are gapped to receive nuts 28 engaged with the threads of the pins 26 and having peripheral worm teeth-cooperating with worms 29 fixed on a transverse operating shaft 30 fitted with a hand wheel 31 and mounted in bearings 32 on the bar 27.

The upper clamp is carried by a frame 33 which is pivotally connected by bolts 34 to the main frame castings to rock about a transverse axis in front of the clamping station. The front clamping element is in the form of a transverse plate 35, to which is hinged a lower part 36. The upper portion 35 is rigidly fixed to the frame 33 of the upper clamp, whilst the lower portion 36 is connected by a transverse horizontal hinge 37 to the upper portion in such a manner that when the clamping frame is raised the lower portion can swing back away from the book and expose sufficient of the side of the book for the pasting-down of the tape ends. When the clamping frame is in its lower or rearward position, which it occupies during the forward travel of the carriage, vertical faces 125 on the rear of the wings 123 on the dies 23 of the lower clamp support the hinged portion 36 that depends from the upper clamp and hold it in the required alignment, to form the main front clamping surface of the lower clamp. It will thus be apparent that the T-slots 126 (Fig. 17), which allow passage of the saws, the piercing knives and the tape-grips through the front clamping surface of the lower clamp, are bounded at their upper edge by the hinged portion 36 that depends from the upper clamp and elsewhere by the lugs 124 of the dies 23.

The rear portion of the upper clamp is a transverse plate 38 carried by two screw-threaded pins 39 which are slidable in guides 40 in the upper clamp frame 33 in front of the front clamping plate 35 and are operated by nuts 41 driven through gaps in the guides 40 by worms 42 on a second operating worm shaft 43. The shaft 43 is mounted in bearings 44 on the upper clamp frame 33 and provided with a hand wheel 45. The whole of the upper clamp and clamp frame, with the book clamped therein can therefore be lifted and rotated about the bolts 34, by lifting the hand wheel 45.

A carriage (Figs. 1, 3, 4 and 10) which carries the slotting, piercing and taping instruments, is provided with two side members 46A and 46B in the form of outwardly opening channels slidably fitted in the channel guides 22A and 22B of the main frame castings and rigidly braced together by cross members. Circular saws 48 for cutting the stems of the T-slots are adjustably fixed on a common transverse spindle 47 which is journalled in ball bearings 49 carried by bearing housings 50 which are fixed to a sub-frame 51 disposed between the side members of the carriage. The rear end of this sub-frame is pivoted to the carriage by two transverse horizontal pins 52 while the front end is provided with a lug 53 having an arcuate slot 54 accommodating a transverse screw stud 55 secured to the side member 46B of the carriage and provided with a clamping nut. The sub-frame can be rocked about its rear pivotal axis with the aid of an adjusting screw 56 engaged in the main frame casting 20B in order to adjust the height of the saws, before the lug 53 is locked to the stud 55. By this means the depth of cut of the saws can be adjusted to the correct dimension.

The sub-frame carries beneath it a secondary frame 57, accommodating an electric driving motor 58 coupled to the saw spindle by a V-belt 59. The secondary frame 57 is pivotally connected by pins 60 at its rear end to the sub-frame and is supported at its front end by an adjustable strut 61 whereby the belt tension can be varied.

Figure 4:
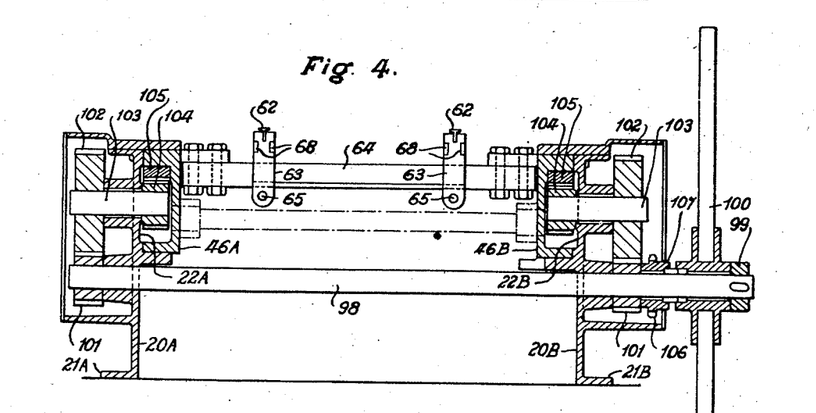
Figure 5:
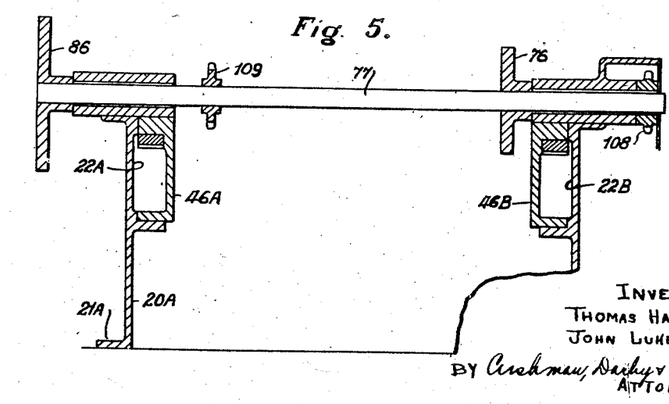

Knives 62 (Figs. 4 and 10) are for cutting the cross pieces of the T-slots supported on knife-holders 63 which are of inverted channel section as seen from the side of the machine and are mounted on a transverse rectangular bar 64 rigid with the carriage, these holders being laterally slidable to any desired position. They are clamped to the bar by horizontal bolts 65 passing below the bar and engaged in the extremities of their downwardly directed members. The T-section knives 62 have the lower ends of their stems held by screws in longitudinal vertical slots in the holders 63. (The section plane of Fig. 4 is broken forwards so that the knife assembly appears in front elevation instead of in section.)

Tape-grips 66 (Fig. 10) adapted to nip the leading ends of pieces of tape against the trailing ends of the knives 62 so that the tapes are fed through the T-slots immediately behind the knives are of the same T-section as the knives but the nose portion of the grips is flat and of a section to pass easily through the cross part of the T-slot, with the tape disposed along its upper surface and bent over the end and lying along its bottom surface. The tape-grips are carried behind the respective knives by tape-grip holders 67 which are longitudinally displaceable relatively to the knives. Each tape-grip holder has two forwardly directed prongs 68 which are slidable in longitudinal grooves in the sides of the associated knife-holder, whereby the knife-blade 62 and the tape-grip 66 are maintained in alignment. A longitudinally disposed screw pin 69 passes through a horizontal bore in the tape-grip holder and is screwed into the rear of the knife holder. A helical compression spring 70 is disposed around this pin, being compressed between the rear face of the tape-grip holder and the head of the pin 69, and this spring urges the tape-grip into contact with the rear end of the knife-blade.

For the purpose of reciprocating the tape-grips longitudinally relative to the knives there is provided a transverse bar 71 carried by levers 72 extending more or less vertically from a bearing pin 73 on the carriage. The transverse bar 71 engages the front ends of the prongs 68 of the tape-grip holders, which ends extend beyond the front face of the knife-holders 63. The upwardly directed levers 72 can be reciprocated by a lever 74 extending rearwardly from the pivoted end of one of the levers 72 and terminating in a cam-follower 75 positioned to engage, when the carriage is in its rearmost position, a cam 76 (Figs. 2 and 5) rigid with a shaft 77 journalled transversely in the main frame and serving to operate the tape-feed mechanism.

Figures 7, 8, 9:
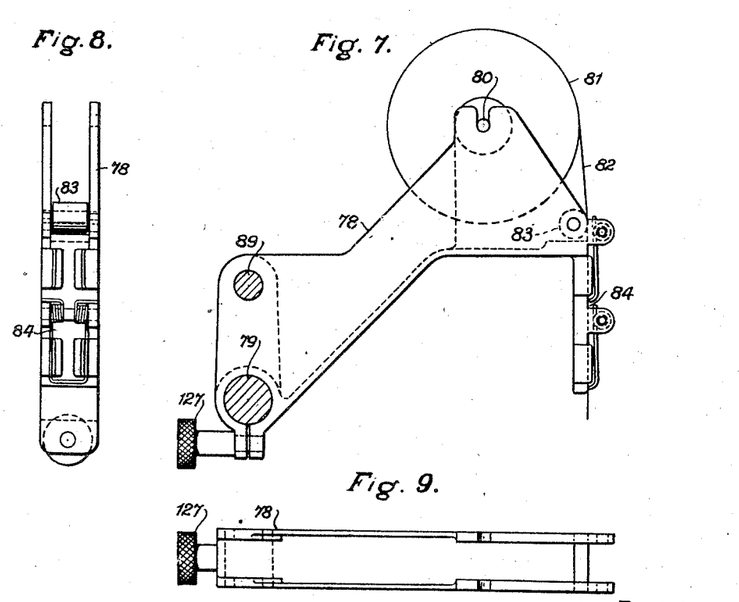
Fig. 7 is a side elevation, on the same scale as Fig. 6, of a tape-reel holder.
Figs. 8 and 9 are respectively a front elevation and a plan of the holder shown in Fig. 7.
Figure 10:
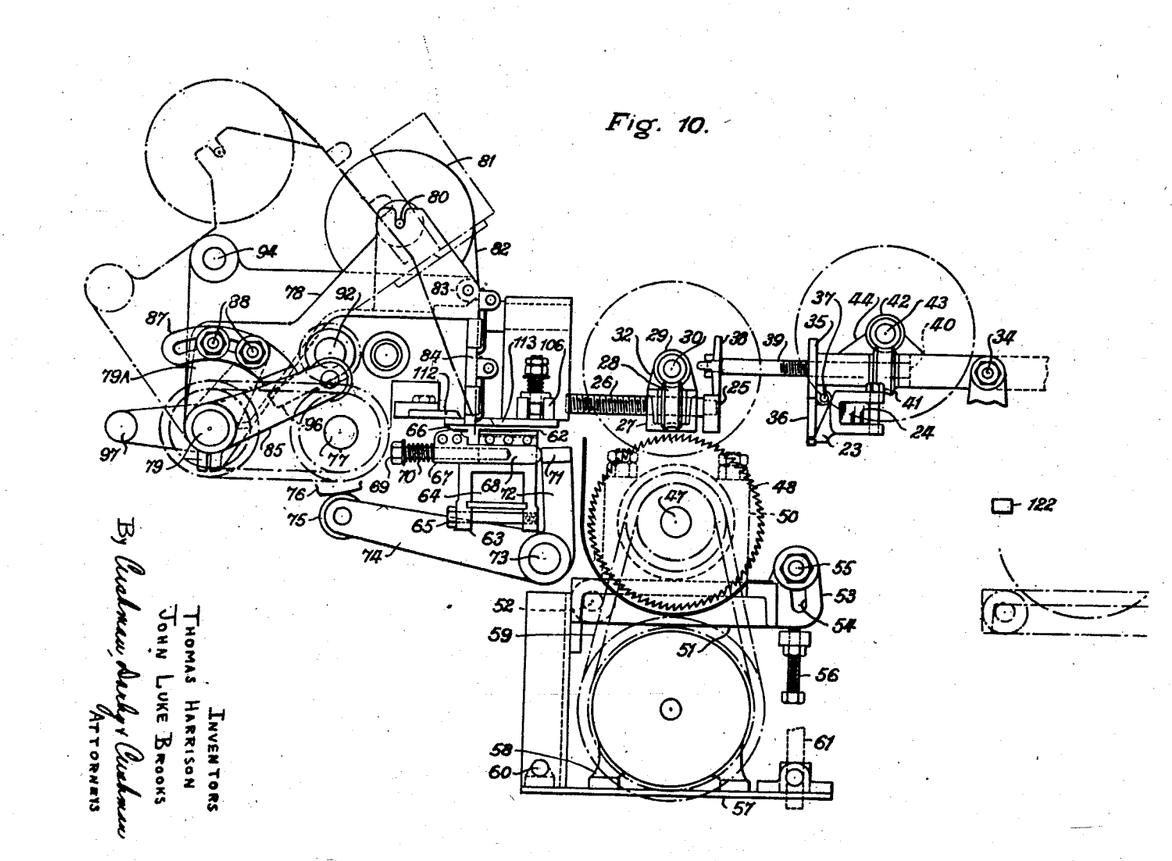
Fig. 10 is a diagram on a slightly larger scale than Fig. 1, showing only certain parts of the machine in side elevation, and intended to facilitate explanation of their operation, Figs. 11 to 15, showing parts of Fig. 10 are different configurations corresponding to successive stages in the cycle of operation.

Tape-feed mechanism includes the required number of tape-reel holder frames 78 (Fig. 7) which are fixed at a variable transverse spacing by means of clamping screws 127 on a transverse shaft 79 at the back end of the main frame members. Each tape-reel holder 78 includes two side members arranged to carry a transverse spindle 80 raised above the upper surface of the main frame members, and upon each spindle 80 is mounted a reel 81 of tape. Each tape 82 is fed downwards from the front of its reel, over a roller 83 and through a spring-loaded friction gate, generally denoted by 84, in such a manner that when the tape-reel holders 78 are in their lowered position, when the carriage is in its rearmost position, and when the tape-grips 66 are displaced rearwards with respect to the knife-holders 63, the lower ends of the tapes 82 depending from the gates 84 can enter into the space between the rear ends of the piercing knives 62 and the fronts of the tape-grips 66 (Fig. 10). The tape-reel holder pivot shaft 79 can be reciprocated by means of a cam-follower lever 85 journalled on this shaft and co-operating with a cam 86 on the transverse shaft 77 which operates the tape-feed mechanism. The cam-follower lever 85 co-operates with a quadrant 87 adjustably fitted by studs and nuts 88 to a lever 79A fast on the tape-reel holder shaft 79 in such a manner that backlash between the quadrant 87 and the cam-follower lever 85 can be varied and thereby the height to which the tape-reel holders are raised by this cam adjusted.

Figure 6:
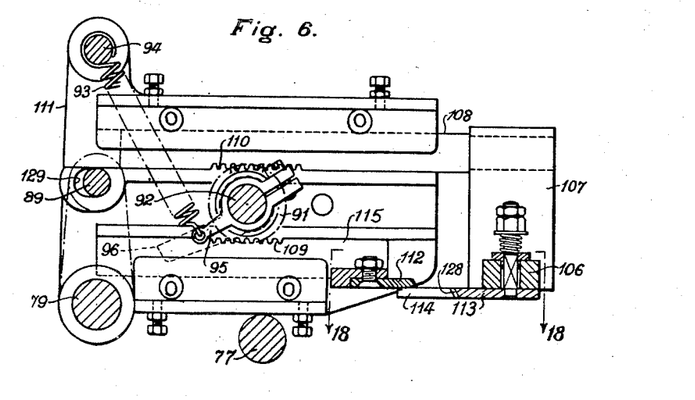
Fig. 6 is a section, on a larger scale, and taken on the line 6—6 in Fig. 2 of the guillotine mechanism.
Figure 18:
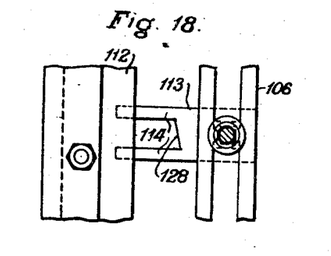
Fig. 18 is a section of a detail taken on the line 18—18 in Fig. 6.

Guillotine mechanism (Figs. 6 and 18) for parting portions of tape of a predetermined length is pivotally mounted on the shaft 79 of the tape-reel holders 78 and coupled to those holders by a transverse shaft 89 fixed to the latter and passing with a slight clearance through eyes 129 in the side members of the guillotine frame 111 in such a manner that, when the tape-reel holder is raised, the guillotine frame will lag slightly remaining in contact with the shaft 77 before following the upward movement of the tape-reel holders 78. The guillotine includes a rear blade 112 which extends throughout the width of the machine close behind the friction gates and a number of separate front blades 113 each having two rearwardly projecting prongs 114 which when the guillotine is open bear on the under surface of the rear blade 112 and between which is a cutting edge 128. The guillotine blades are omitted from Fig. 2.

Figure 1:
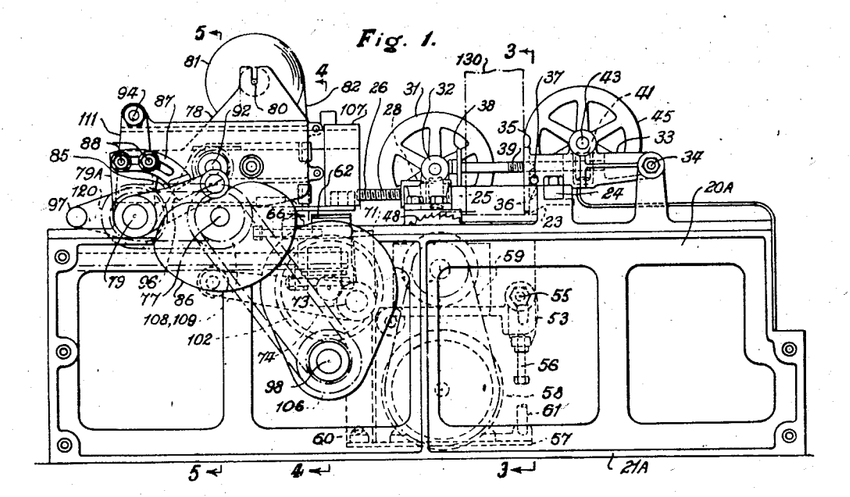
Fig. 1 is a side elevation of the machine, the front of the machine being at the right-hand side of the figure.
Figure 2:
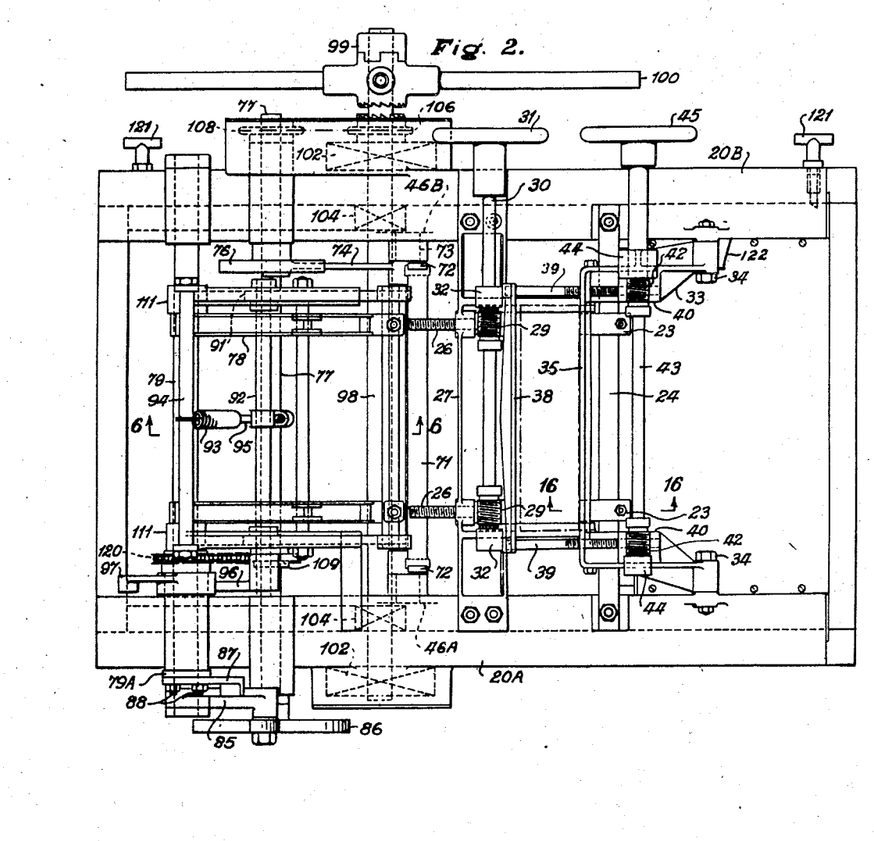
Fig. 2 is a plan, from which most of the carriage has been omitted.
Figure 3:
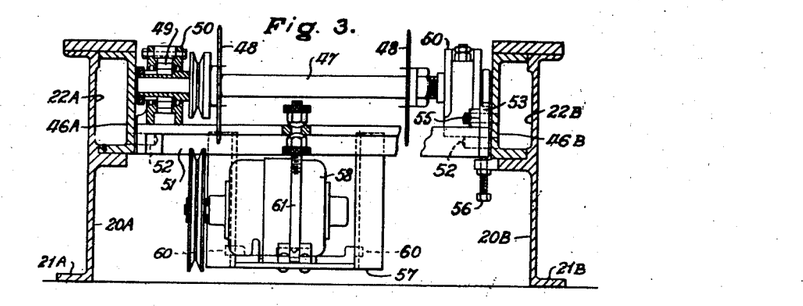
Figs. 3, 4 and 5 are sections, taken respectively on the lines 3—3, 4—4 and 5—5 in Fig. 1, of details included in the lower part of the machine, the left-hand bearing of the saw spindle being shown in section in Fig. 3.

The rear blade 112 is carried on two lower slides 115 longitudinally slidable in the two side members respectively of the guillotine frame 111, while the front blades 113 are carried by a transverse bar 106 which in turn is carried by brackets 107 depending from two upper slides 108 also slidable respectively in the two frame side members of the guillotine. The two slides on each side of the machine are provided on their opposing surfaces with rack teeth 109 and 110 co-operating with a common pinion 91 which is fast on a transverse shaft 92 journalled in the guillotine frame. The shaft 92 is biased to maintain the guillotine blades normally in their open position by means of a tension spring 93 anchored to a transverse bracing member 94 of the guillotine frame and acting on a lever 95 fast on the shaft 92. Another lever 96 (Figs. 1 and 10) on the left-hand end of the shaft 92 co-operates with a crank 97 rotatable about the shaft 79 in such a manner that, when this crank while moved clockwise as seen in Figs. 1 and 10 strikes the lever 96, the slides are moved so as to cause the guillotine to operate to sever the tapes and thereafter to spring open again.

The hand operating mechanism includes a main shaft 98 (Figs. 1, 2 and 4) extending from side to side of the machine and journalled in the main framing. At the right-hand end of this shaft is fixed a jaw-clutch member 99 having inwardly-directed teeth, and a capstan 100 journalled on the shaft has outwardly-directed jaw-clutch teeth adapted to mesh with the teeth of the member 99 when the capstan is slid outwards on the shaft.

To the main shaft 98 are keyed two pinions 101 which mesh respectively with two gear wheels 102 fixed on stud shafts 103 which are journalled respectively in the main frames and are rigid with pinions 104 engaging racks 105 fixed in the frame side members of the carriage.

A chain sprocket 106 is journalled on the main shaft 98 on the inner side of the capstan and provided with ratchet clutch teeth 107 adapted to mesh with corresponding teeth on the capstan when the latter is slid inwards along the shaft. The sprocket 106 is connected by a chain with a sprocket 108 fast on the shaft 77 which actuates the tape-feed mechanism. A sprocket 109 fixed to the shaft 77 is connected by a chain with a sprocket 120 rigid with the boss of the lever 97 that actuates the guillotine.

The main frame may be provided with two locking latches 121 (Fig. 2) disposed respectively at the front and back ends of the machine and engageable, for example under the influence of springs, in locating holes in the carriage so as to ensure correct location of the carriage at each end of its stroke.

The machine is operated as follows, the carriage being assumed to be at the rear end of the machine and the necessary number of tapes 82 assumed to be threaded through the friction gates 84 with their lower ends between the knives 62 and the tape-grips 66, which are spaced from the knives, as shown in Fig. 10.

The upper book clamp frame 33 occupies its rearward position and the book to be operated on is placed in the clamping station and the shaft 43 controlling the upper book clamp is rotated, drawing the plate 38 towards the plate 35, to tighten the upper clamp on the book 130. Thereafter the shaft 30 controlling the lower book clamp is rotated to tighten the lower clamp and this completes the clamping operation.

Figures 11, 12, 16, 17:
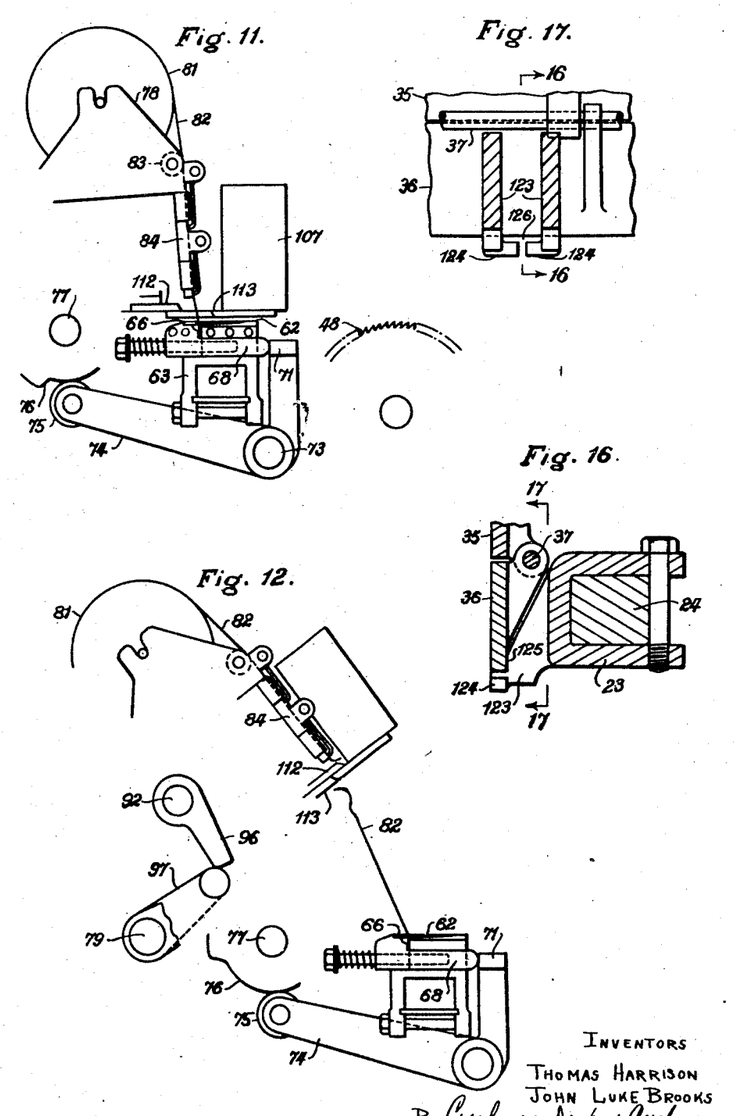

The capstan 100 is now pushed inwards so as to engage the ratchet clutch and is rotated to operate the tape-feed mechanism. First the rearwardly extending lever 74 controlling the tape-grips is permitted by its associated cam 76 to rise so that the tape-grips 66 move forward under the influence of their springs 70 and nip the depending ends of the tapes against the rear ends of the knives 62. Next the cam 86 controlling the rocking of the tape-reel holders raises the tape-reel holders by means of the shaft 79 and thereby causes predetermined lengths of tape to be unreeled and drawn through the friction gates. During the first portion of the rising movement of the tape-reel holders the guillotine remains stationary resting on the shaft 77. The mechanism is shown in this condition in Figs. 6 and 11. When the backlash provided by the eyes 129 (Fig. 6) between the tape-reel holders and the guillotine frame has been taken up, the guillotine also rises with the tape-reel holders, its blades 112 and 113 being now spaced a short distance below the level of the bottom of the friction gates. After the tape-reel holders have been raised to the top of their stroke, the guillotine-actuating crank 97 strikes the lever 96 on the guillotine-actuating shaft 92 and causes the guillotine to sever the drawn-out portions of tape a short distance below the bottoms of the gates (Fig. 12).

Figure 13:
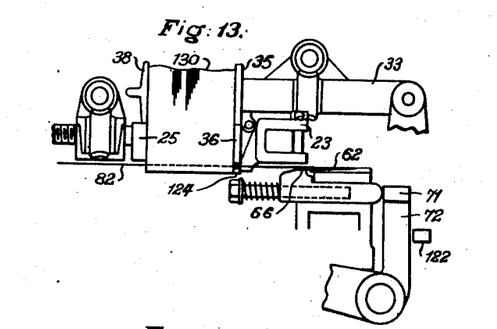
Figure 14:
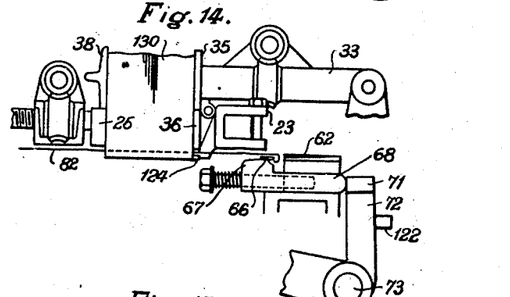
Figure 15:
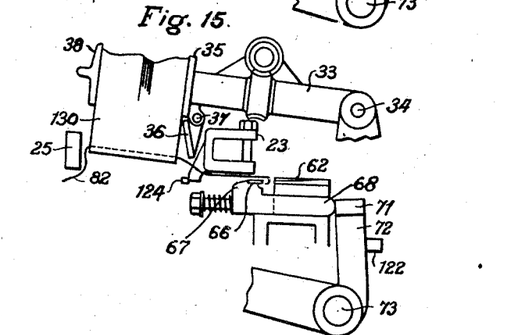

The capstan 100 may now be drawn outwards so as to engage the carriage-driving jaw-clutch member 99, and after the rear locking latch 121 has been released, the capstan is rotated so as to propel the carriage forward. The saws cut the stems of the T-slots through the back of the book, and thereafter the knives pierce the cross pieces of the T-slots, and the tapes are drawn by the tape-grips through the cross pieces of the completed slots. As the carriage is about to reach the end of the forward stroke, where the sub-frame 51 will occupy the position shown by chain-dotted lines in Figure 10, one of the levers 72 carrying the transverse bar 71 that actuates the tape-grips engages a stop 122 (Fig. 13) which is fixed to the frame of the machine below the level of the bar 71; as the carriage completes its stroke, this lever 72 is rocked counter-clockwise about the stop by the continued forward movement of the bearing pin 73, and as a result the bar 71 is pressed into contact with the ends of the prongs 68 of the tape-grip holders, pushing these back clear of the front ends of the tapes which became hooked back under the tape-grips during their passage through the slots. The condition of the apparatus is here as shown in Fig. 14, where the book is denoted by 130. When the carriage has completed its stroke, the front locking latch 121 engages and holds the carriage stationary. The lower book clamp is now released by reversely rotating the shaft 30. The upper clamp, still holding the book, is then swung upward and forward about its pivot 34, so as to bring the back of the book uppermost, and the ends of the tapes are pasted down to the two sides of the book at the portions thereof which were previously covered by the rear clamping member 25 of the lower clamp and the hinged portion 36 depending from the front clamping member of the upper clamp which has by now swung clear of the book. Fig. 15 shows the book released from the lower clamp and beginning its upward and forward movement.

The capstan after the front locking latch has been released is now rotated in the reverse direction, so as to bring the carriage back to its rearmost position in which it is again latched. There the capstan is slid inwards to re-engage the ratchet clutch and rotated so as to cause firstly the tape-grips to be forced rearwards relatively to the knives and thereafter the tape-reel holder and the guillotine to be lowered by their controlling cam 86.

When the guillotine blades are close above the knives and the tape-grips, the guillotine meets the shaft 77 and remains stationary, while the tape-reel holders continue to move downwards for a small distance, bringing the depending leading ends of the tapes between the open guillotine blades and between the knives and their associated tape-grips ready for engagement in the next cycle of operations.

Although the above described machine is hand-driven, it will be clear that mechanism equivalent to that described for performing the several operations can be embodied in a power driven machine.

We claim:

1. A bookbinding machine for forming substantially T-shape slots through the back of a book and for passing a tape through the cross pieces of the T, including clamping means for holding the sheets of a book together, cutting means adapted to pass through the book to form the cross piece of the T-slot, a carrier for the cutting means movable relatively to the clamping means for passing the cutting means through the book, releasable means for maintaining an end of the tape against the back of the cutting means during the slot cutting operation so that the tape is drawn through the slot with the cutting means, and means for moving the releasable means relative to the cutting means upon completion of the slot cutting operation so as to leave the tape in the slot.

2. A bookbinding machine as claimed in claim 1, having spring means for maintaining the releasable means against the cutting means during the slot cutting operation, wherein the clamping means are stationary and the said carrier travels to effect the slot cutting operation, and the said means for moving the releasable means being a stop for arresting the travel of the releasable means when the tape is positioned in the slot.

3. A bookbinding machine as claimed in claim 1, including means for maintaining the book clamping means adjacent to the path of the cutting means, and means for moving the clamping means away from the path of the cutting means.

4. A bookbinding machine as claimed in claim 1, wherein the clamping means serve to clamp the leaves of a book with the back of the book directed downwardly during the slot cutting and tape threading operations, and wherein means for mounting the book clamping means on the machine are so displaceable that the clamping means can be moved with the clamped book, after the slot cutting and tape threading operation, into a position which brings the back of the book uppermost.

5. A bookbinding machine as claimed in claim 1, wherein the clamping means include an abutment adapted to lie against the book on the side where the slot cutting means pass out of the book and between the back of the book and the top of the stem portion of the T-slot, said abutment being shaped and dimensioned to permit passage of the slot cutting means through and beyond the same.

6. A bookbinding machine as claimed in claim 1, wherein the clamping means serve to clamp the book over an area spaced from the back of the book and include an abutment adapted to lie against the book on the side where the cutting means pass out of the book and between the back of the book and the top of the stem portion of the T-slot, said abutment being shaped and dimensioned to permit passage of the slot cutting means through and beyond the same, and a hinge member mounted in said clamping means on the same side of the book as the abutment member and arranged to be held by the abutment member against the book during the slot cutting operation.

7. A bookbinding machine as claimed in claim 1, wherein the said clamping means include clamping elements for gripping the book over an area spaced from the back of the book, an abutment member arranged to lie against the book on the side where the cutting means pass out of the book and to prevent displacement of the leaves of the book during the slot cutting operation, said abutment member being so shaped and placed as not to interfere with the cutting means during the slot cutting operation, and an additional clamping element for clamping the book against the abutment member.

8. A bookbinding machine as claimed in claim 1, and having tape delivering and severing mechanism mounted on a stationary portion of the machine, said mechanism comprising a tape reel, a guide for tape being run off from the reel, means for moving the reel and guide to a position in which the tape end is adapted to be gripped between the releasable means and the cutting means and for raising the reel after the tape end has been gripped and to draw off the reel a predetermined length of tape, and means for severing the length of tape when the reel is moved to its raised position.

9. In a book making machine, the combination of a book clamp including an abutment, a clamping element movable towards the abutment for clamping the sheets of a book over an area adjacent to the back of a book, a pair of clamping elements one of which is capable of alignment with the abutment and the other of which is movable towards the said one element for clamping the sheets of the book over an area spaced from the back, and a common support for the pair of clamping elements displaceable for withdrawing a book clamped by said pair transversely out of the space between the abutment and the first clamping element.

10. In a book making machine, the combination of a book clamp including a pivoted support, a first clamping element on the support, a second clamping element movable towards the first element for clamping the sheets of a book over an area spaced from the back of the book, a third clamping element hingedly connected to the first element, an abutment positioned to engage the back of the third clamping element when the support is in one operating position, a fourth clamping element movable towards the abutment for clamping the sheets of the book over an area adjacent to the back of the book against the third clamping element when the support is in the said position, and means for moving said support and thereby withdrawing a book clamped by the first and second clamping elements out of the space between the third and fourth clamping elements.

11. A bookbinding machine for forming substantially T-shaped slots to the back of a book and for passing tapes through the cross-piece of the T, including clamping means for holding the sheets of a book together, cutting means adapted to pass through the book to form the cross-piece of the T-slot, a carrier for the cutting means movable relatively to the clamping means for passing the cutting means through the book, grip means on one side of the cutting means and movable toward and away from the same, said grip means being normally spaced from the cutting means for feeding tapes between the cutting means and the grip means, yieldable means for moving the grip means against the cutting means so as to hold the tapes firmly against the rear edge of the cutting means during the slot forming operation and to draw the tapes through the slot with the cutting means, and means for moving the grip means away from the cutting means upon completion of the cutting operation so as to leave the tapes in the slots.

THOMAS HARRISON.
JOHN LUKE BROOKS.

REFERENCES CITED

The following references are of record in the file of this patent:

UNITED STATES PATENTS

| Number | Name | Date |
|---|---|---|
| 1,714,299 | Davis | May 21, 1929 |
| 1,980,267 | Gould et al. | Nov. 13, 1934 |

FOREIGN PATENTS

| Number | Country | Date |
|---|---|---|
| 395,161 | France | Dec. 19, 1908 |